United States Patent [19]

de Navas Albareda

[11] 4,056,593

[45] Nov. 1, 1977

[54] METHOD OF MAKING A FASTENER

[75] Inventor: José Luis de Navas Albareda, Barcelone, Spain

[73] Assignee: Repla International S.A.H., Luxembourg,

[21] Appl. No.: 481,741

[22] Filed: June 21, 1974

Related U.S. Application Data

[63] Continuation of Ser. No. 235,315, March 16, 1972, abandoned.

[30] Foreign Application Priority Data

Mar. 26, 1971 Spain .................................... 389609

[51] Int. Cl.² ........................ B29D 5/00; B29C 17/08; B29F 3/00
[52] U.S. Cl. .................... 264/145; 264/151; 264/154; 264/167; 264/176 R; 264/210 R; 264/288; 264/296
[58] Field of Search ............... 264/145, 151, 167, 204, 264/288, 296, 154, 176 R; 425/289, 296, 308, 445; 83/1, 5, 406, 917

[56] References Cited

U.S. PATENT DOCUMENTS

| 2,607,713 | 8/1952 | Waugh | 156/140 |
|---|---|---|---|
| 2,895,170 | 7/1959 | Carlile | 264/151 |
| 3,329,998 | 7/1967 | Stohr | 264/209 |
| 3,557,413 | 1/1971 | Engle | 24/204 |

Primary Examiner—Willard E. Hoag
Attorney, Agent, or Firm—Emory L. Groff, Jr.

[57] ABSTRACT

A method for producing an article-catching strip consisting in starting from a preferably extruded strip of material provided on at least one side with longitudinal ribs and in cutting across said ribs notches defining between same substantially hook-shaped elements adapted to catch a similar strip or a piece of fabric. The invention covers also the corresponding arrangement which includes an extruding machine, a drum or the like guiding means feeding the ribbed strip to a cutting system beyond which the strip provided with its article-catching elements may be stretched in a drawing frame to more widely space said elements.

4 Claims, 7 Drawing Figures

METHOD OF MAKING A FASTENER

This is a continuation of application Ser. No. 235,315, filed Mar. 16, 1972 now abandoned.

Article-catching means are known which are constituted by a strip provided on one side with a multiplicity of catching means. In a known embodiment, the strip is made of a velvet or similar fabric, the pile of which is made of synthetic resin and terminates with incurved hook-shaped ends. When such a strip engages a similar strip or else another piece of fabric, its hooked pile seizes said other strip or piece of fabric, whereby the first mentioned strip is held fast on said other strip or piece of fabric. Such hook-shaped catching means must be woven on special looms an are comparatively expensive.

The present invention has for its object a very cheap method of producing article-catching means of the type referred to.

According to the invention, said article-catching means are constituted as precedingly by a strip provided on one side with a multiplicity of catching means. Its novelty resides in that it is obtained starting from a shaped strip showing longitudinal ribs on at least one side while transverse cuts are made across the ribs.

The invention covers also an arrangement for executing said method, said arrangement including means for guiding the strip, means for cutting across the ribs of the strip and a strip-drawing frame.

The accompanying drawing illustrates by way of example a plant for the execution of the above-described improved method together with the successive stages of the production of the article-catching strip. In said drawing.

Figure 1:
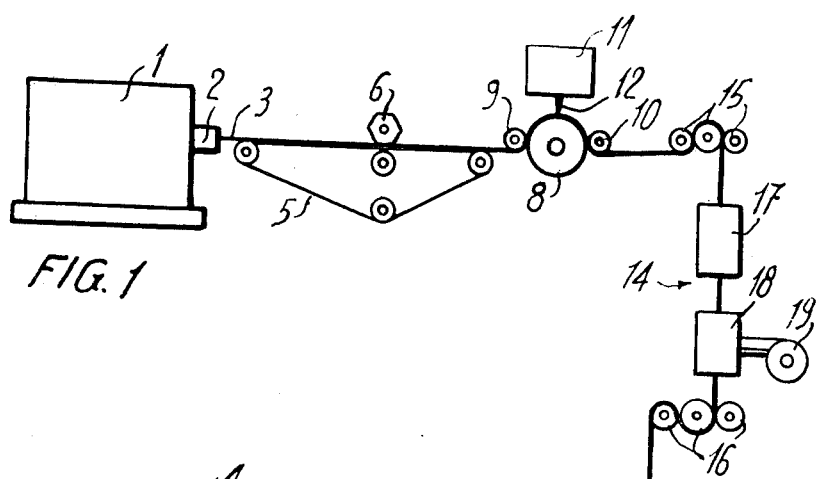
FIG. 1 is a general diagrammatic view of said arrangement.
Figure 2:
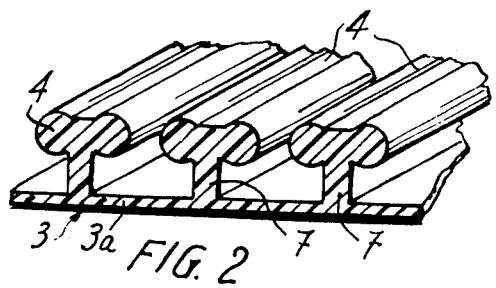
FIG. 2 is a perspective view of a portion of the strip as it passes out of an extruding machine.

As illustrated in FIG. 1, the improved arrangement includes an extruding machine producing, by means of a die 2, a strip 3 of thermoplastic material, which strip shows (FIG. 2), when it passes out of the extruding machine, a co-extensive base portion 3a with a number of longitudinal spaced apart adjacent ribs 4 on one of its sides.

When leaving the extruding machine 1, the strip 3 is comparatively soft and, in order to prevent undesired deformations, it is carried by an endless conveyor belt 5 until it has cooled by a sufficient amount for it to show a sufficient stiffness.

Before the strip 3 reaches the end of the conveyor belt 5, it passes underneath a roller 6 the periphery of which shows areas lying at different distances from its rotary axis. Said roller exerts thus a pressure of variable intensity on the ribs 4, which produces deformations of the webs 7 of the ribs 4, whereby the height and breadth of the latter vary throughout the length of the strip 3. Such modifications in the transverse size of the ribs are not essential but they act favorably on the catching properties of the strip.

Figure 3:
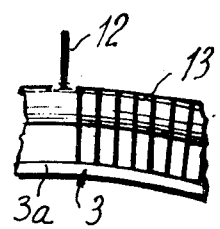
FIG. 3 shows a portion of the strip as it passes underneath a cutting system adapted to notch the strip.

When it has left the conveyor belt 5, the strip passes over a drum 8 in contact with which it is held by two rollers 9 and 10. Said drum is located underneath a cutting system 11 provided with a flat cutting blade 12 adapted to reciprocate so as to cut notches 13 across the ribs 4 on the strip, as shown in FIG. 3. The depth of the notches is such that only the ribs are cut while the solid flat base portion 3a of the strip is not engaged by the cutting blade 12.

After it has registered with the cutting system 11, the strip 3 reaches a drawing frame 14 which includes strip-driving means constituted by the rollers 15 at the input end of the frame and further rollers 16 at the output end. The output end rollers make the strip progress by a speed about 50% higher than the speed imparted by the input rollers 15. In the actual drawing frame, the strip 3 passes first through heating means 17 which may be, for instance, an electric radiator radiating infra-red rays, and then through cooling means 18 which may be constituted simply by a chamber fed with cool air by a fan 19.

Figure 4:
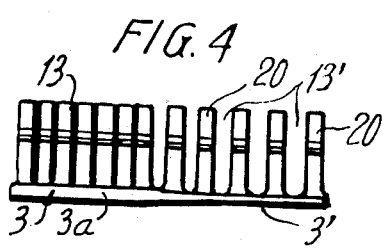
FIG. 4 shows the modification in shape of the strip when subjected to a hot drawing process.
Figure 5:
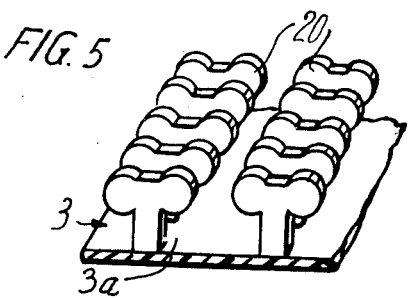
FIG. 5 is a perspective view of a portion of the strip in its final condition.

FIG. 4 shows the modified shape assumed by the strip when it has passed through the drawing frame. As illustrated, the body of the drawn out solid base portion 3a of the strip has become longer and thinner as shown at 3'. At the same time, the originally very narrow notches 3 broaden considerably so as to form a comparatively large interval 13' between the successive catching elements. There is obtained thus a strip 3 the general appearance of which is shown in FIG. 5 and wherein each element cut out of a rib 4 and then drawn apart acts as an upstanding catching element 20.

Obviously, numerous modifications may be brought to the method and means described, chiefly as concerns the shape of the rib 4, which shape defines the final shape given to the catching elements. The latter may, in particular, be in the shape of an arrow or of a harpoon, if it is desired to increase its catching capacity.

Obviously also, if it is desired to obtain a high speed for the production of the notches, the cutting system may be provided with a plurality of cutting blades operating simultaneously.

Figure 6:
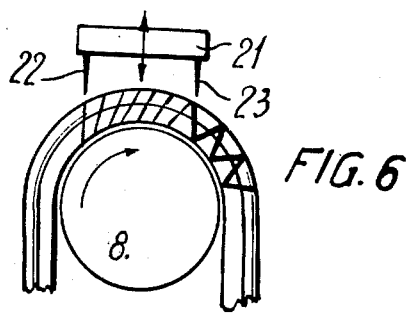
FIG. 6 illustrates a cutting system provided with two blades adapted to form notches in the ribs of the strip.
Figure 7:
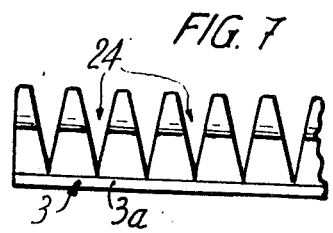
FIG. 7 is a longitudinal cross-section of the strip, showing the notches obtained by means of the arrangement according to FIG. 6.

FIGS. 6 and 7 relate to a modification of the cutting system which may be used in an arrangement producing article-catching means. The strip 3 passes in this case over a drum 8 of a comparatively large size in registry with a cutting system constituted by an arm 21 carrying two cutting blades. The latter lie in two planes lying to either side of the rotary axis of the drum 8, said blades forming thus notches sloping obliquely in opposite directions with reference to the longitudinal direction of the strip 3.

The spacing between the blades 22, 23 and the speed of progression of the strip are selected in a manner such that the bottom of a notch executed by one blade may register with that executed by the other blade. It is thus possible to obtain, as illustrated in FIG. 7, V-shaped notches 24 providing a sufficient spacing between the successive article-catching elements. This results in a possibility of cutting out the strip drawing step as described with reference to FIGS. 1 and 4.

In the embodiment illustrated, the strip 3 is provided with ribs on only one side, but, of course, such ribs may be carried on both sides, whereby a succession of article-catching elements is formed on each side of the strip 3, the elements located on one side being similar to or different from those in the opposite side.

I claim:

1. A method of manufacturing a strip including fastener projections to form in combination with a similar strip a closure member, the steps consisting of extruding a strip of synthetic resin having longitudinal ribs on at least one of its faces, passing said strip beneath a forming member to deform the ribs on said upper face and thereby vary the height and width of the ribs throughout the length of said strip, passing the strip partially around a roller disposed beneath a cutting member, actuating said cutting member to cut transverse spaces in said ribs, passing the strip through a heating zone and cooling the thus formed strip.

2. A method according to claim 1 including the further step of stretching said strip longitudinally so as to increase the width of said transverse spaces relative to said longitudinal ribs after passing the strip through said heating zone.

3. A method according to claim 1 wherein said cutting member includes a pair of spaced blades parallel to each other and to the axis of said roller and actuation of said cutting member forms transverse V-shaped spaces in said ribs.

4. A method of manufacturing a strip including fastener projections to form with a similar strip a closure member, the steps consisting of: extruding a strip of synthetic resin in comparatively soft condition and having a longitudinal co-extensive base portion provided with parallel spaced apart upstanding longitudinal ribs on at least one of its faces supporting the strip on an endless conveyor until it has cooled to an extent sufficient to achieve stiffness relative to its extruded soft condition, passing said strip beneath a forming member to deform the ribs on said base portion face and thereby vary the height and width of the ribs throughout the length of said strip, cutting transverse parallel spaces in said spaced apart ribs to form a plurality of adjacent spaced apart upstanding catching elements from each rib, passing the cooled strip through a heating zone and stretching said base portion longitudinally so as to increase the width of said transverse spaces relative to said catching elements, and cooling the thus formed strip.

* * * * *